INVENTOR.
EDWARD L. KOCHEY JR.

BY Harris J. Luther

ATTORNEY

INVENTOR.
EDWARD L. KOCHEY JR.
BY Harris T. Luther
ATTORNEY

June 2, 1964  E. L. KOCHEY, JR  3,135,246
TWIN FURNACE UNIT AND METHOD OF OPERATION
Filed July 27, 1961  4 Sheets-Sheet 3

INVENTOR.
EDWARD L. KOCHEY JR.
BY *Harris J. Luther*
ATTORNEY

June 2, 1964 E. L. KOCHEY, JR 3,135,246
TWIN FURNACE UNIT AND METHOD OF OPERATION
Filed July 27, 1961 4 Sheets-Sheet 4

INVENTOR.
EDWARD L. KOCHEY JR.

BY *Harris Y. Luther*

ATTORNEY

United States Patent Office 3,135,246
Patented June 2, 1964

3,135,246
TWIN FURNACE UNIT AND METHOD
OF OPERATION
Edward L. Kochey, Jr., Colebrook, Conn., assignor to Combustion Engineering, Inc., Windsor, Conn., a corporation of Delaware
Filed July 27, 1961, Ser. No. 127,387
30 Claims. (Cl. 122—240)

This invention relates generally to vapor generators and methods of operation thereof and has particular relation to vapor generators and their operation at supercritical pressures.

In accordance with the invention there is provided a supercritical vapor generator that is of twin unit design, employing twin or separated furnaces from which extend separate gas passes, and which generator operates on the double reheat cycle. The two furnaces each have their walls lined with vertically extending tubes which are connected at their lower ends with suitable inlet headers and at their upper ends with suitable outlet headers with the tubes in each furnace being in parallel flow relation and with the two furnaces being connected for series flow of the working medium. The furnace wall tubes of each furnace form one of the heat exchange portions of the through-flow system of the supercritical vapor generator and there is provided a feed pump which forces the through-flow through the system in accordance with the demand on the unit and at a pressure which is regulated to produce the desired supercritical pressure at the inlet of the turbine which is supplied by the generator. Adjacent furnace wall tubes are welded together throughout the extent of the walls so that the tubes present a generally imperforate metallic inner lining for the furnaces. Connected across the furnaces in a manner to supplement the through-flow through the furnace wall tubes is a recirculating system with this system being effective to insure that an adequate flow velocity is had to protect the tubes throughout the range of operation of the generator. There is provided an uncontrolled self-regulating circulating pump which floats on the through-flow circuit and which is effective to provide the necessary recirculation of working medium through the furnace wall tubes as mentioned hereinbefore.

The generator is provided with high pressure and low pressure reheaters and for ease of control these reheaters are unevenly divided between the two units. For example, the high pressure reheater may have a predominate portion of its heat exchange surface disposed in the gas passageway of one of the units while the low pressure reheater may have a predominate portion of its heat exchange surface in the gas pass of the other unit. With this arrangement the two reheat temperatures may be controlled partly if not entirely by means of controlling the heat content of the gases egressing from the respective furnaces as by means of gas recirculation or by varying the zone of combustion in the furnace.

By arranging the two furnaces in series flow relation and providing the recirculating system with relation thereto, the aforementioned parallel tubular lining for the furnaces may be employed while maintaining the tube diameters at reasonable and normal values employed with vapor generators and also maintaining the stresses developed in a welded wall formed of these parallel tubes low and with the recirculating pump requirements being within reasonable limits.

It is an object of this invention to provide an improved supercritical vapor generator and method of operation thereof.

It is a further object of this invention to provide such a generator having a twin furnace design and with the arrangement being such as to permit welded furnace wall construction.

A still further object of the invention is to provide a supercritical vapor generator having a twin furnace design the walls of which are lined with parallel flow tubes and wherein the system includes a recirculating circuit operative to supplement the flow through the furnace wall tubes over that of the through-flow and with the circulating system being self-regulating.

Still another object of the invention is the provision of such a supercritical, twin furnace vapor generator which is operated on the reheat cycle and wherein one of the reheats is subjected primarily to and is controlled at least in part by the combustion gases and the regulation thereof generated in and issuing from one of said furnaces while the other reheat is similarly influenced by the combustion gases generated in and issuing from the other furnace.

Other features and advantages will be apparent from the specification and claims and from the accompanying drawings which illustrate a preferred embodiment of the invention and in which:

Figure 1:
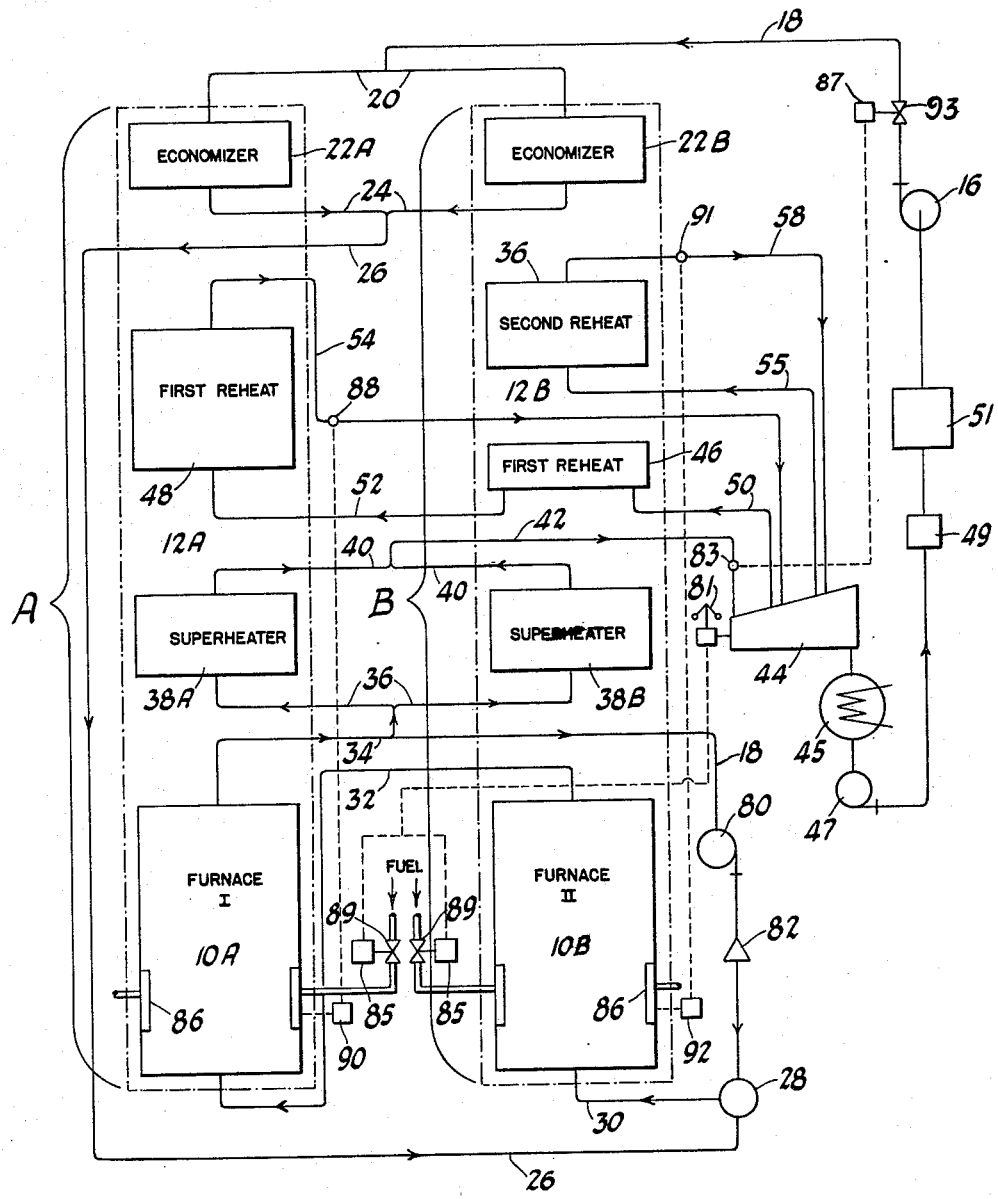
FIG. 1 is a schematic representation of the vapor generator of the invention with this figure being in the nature of a flow diagram and showing the two units which make up the vapor generator in side-by-side relation and the disposition of the various heat exchange units or surfaces in accordance with their relative positions with regard to combustion gas flow.

At certain capacities of vapor generators (there being a limit to the width of a single wall that can be properly supported) and with certain cycles, the twin furnace design, employing separated furnaces, is necessary. This design together with the inherent characteristics that prevail at supercritical pressures tend to render the furnace wall design and construction, particularly with regard to the heating surface that lines the walls thereof, a difficult one. This is so because the twin furnace design has a relatively large total volume and accordingly a large surface area. The size of each of the furnaces in a twin furnace arrangement is regulated by fuel burning considerations with their being a definite minimum limit that is permissible so that there is a corresponding minimum limit of the circumference and wall area of the furnaces. This necessitates there being a large number of tubes lining the furnace walls when the type of construction utilizing vertically extending tubes that are welded together throughout the length of the wall is utilized. With this construction these tubes, which traverse the furnace wall from top to bottom only once, present a relatively large combined total flow area through which the through-flow of the supercritical vapor generator passes.

It is, of course, necessary that the flow velocity through the furnace wall tubes be maintained above a predetermined minimum or critical value in order to insure adequate protection of the tubes against overheating. However, in a supercritical vapor generator, which of necessity is of the through-flow type, the through-flow or flow of working medium that is produced by the feed pump at the beginning or entrance of the through-flow circuit is regulated in accordance with the demand on the unit so that the supply of working medium fed to the unit by the feed pump is in accordance with and equals the demand imposed upon the unit for the working medium. Since the through-flow varies in accordance with the demand the velocity of flow through the parallel furnace wall tubes will also vary and if the parallel flow tubes are maintained at a reasonable diameter the flow therethrough will not be adequate below a predetermined load which is well within the desired operating range of the vapor generator.

This problem is overcome in accordance with the present invention by connecting the furnace wall tubes of the two furnaces in series flow relation with regard to the through-flow and by superimposing upon the through-flow system a recirculating system which is effective to recirculate working medium through the furnace wall tubes with this system being arranged so that it is self-regulating in nature. By connecting the furnace wall tubes of the two furnaces in series the flow area that is presented to the through-flow is just one-half of what it would be if the furnaces were in parallel flow relation. This connection of the furnaces in series does not sacrifice in any way the advantages that are attained by means of the welded, parallel tube furnace wall construction since each of the furnaces is provided with this construction which has decided advantages in regard to fabrication, erection and support of the furnaces and since the furnaces are separate and independent there would be no advantages, insofar as the use of this construction is concerned, in connecting the furnaces for parallel flow. In fact, the series flow arrangement has the advantage of decreasing the temperature difference between the inlet and the outlet of each of the tubes of the furnaces with this in turn tending to decrease the tendency for there being an unbalance in the temperature of the working medium and accordingly the temperature of the tubes transversely of the furnace walls.

Even with the two furnaces connected for series flow, the diameter of the tubes which line the furnace walls would be very small if adequate flow is to be provided through these tubes by the through-flow at low load operation. Accordingly, there is connected across the furnace wall tubes a circulating system which is superimposed upon the through-flow system and which is effective to recirculate working medium through the furnace wall tubes. This recirculating system is effective to recirculate fluid in a manner inversely of the through-flow, or load on the generator, so as to insure that the flow velocity through the furnace wall tubes does not fall below a predetermined minimum and critical value. The system is arranged so that below a predetermined load the through-flow is inadequate to maintain or to provide the necessary critical flow velocity through the tubes. The circulating system is operative to insure that below this load the combined flow of recirculation and through-flow provides this critical velocity and the circulating system is so designed that at the predetermined load where through-flow alone is adequate, or rather becomes inadequate, the combined flow is substantially greater than that necessary for tube protection providing an added safety feature as brought out hereinafter.

With the series flow connection of the two furnaces with regard to the through-flow and with the circulating system superimposed on the through-flow system and connected across the furnaces, a design is provided which permits welded parallel tubular wall construction for each of the furnaces with the tubes being of reasonable size with the normal, readily available size proven through long use being employed and which permits the pumping requirement of the circulating pump to be within reasonable limits in order to maintain the necessary minimum velocity through the furnace wall tubes for cooling. Connecting the two furnaces in parallel with regard to the through-flow would provide an unreasonable amount of pumping for the circulating system with no advantage insofar as providing adequate protection of the tubes is concerned and with the disadvantage of producing a substantially greater temperature difference between inlet and outlet of the vertically extending parallel flow furnace tubes.

Without the recirculating system there would be a definite lower load limit where the flow through the tubes is adequate, such as 30 percent of maximum load, and even then, as previously mentioned, very small diameter tubes are required to give the minimum critical velocity. Because of the relatively small diameter tubes that are required in such an arrangement in order to provide the minimum critical velocity at the minimum acceptable load of operation the restrictive effects that deposits, as well as variations of tube size within the manufacturing tolerances, have on the temperature of the fluid in the tube and the temperature of the tube itself is much greater than with larger diameter tubes. Furthermore, if fins are employed on these relatively small diameter tubes there is presented an unfavorable area relationship of steel to fluid for heat transfer purposes. In addition to these disadvantages there is the very serious problem of nonuniform temperature distribution throughout the tube panels that line the walls of the furnace. This is especially true for low loads and in particular under startup conditions since at this time the ratio of furnace heat absorption to over-all absorption is at its peak and the entering or feedwater temperature is low. This leads to considerable thermal stresses across the panel width. As a result of starting the unit and changing load on the unit these stresses vary so that a cyclic stress condition is set up which renders the panel susceptible to fatigue failure over a period of time.

The variation of these stresses with changing load is caused, among other things, by variation of the temperature difference between the inlet and the outlet of the tubes within the panels with varying load and by variations of the heat absorption transversely of the furnace wall with varying load. The higher the temperature difference between inlet and outlet the greater the danger of there being a considerable outlet temperature unbalance across the panels and around the furnace circumference. The temperature difference between inlet and outlet of each of the tubes is a result of the effect in a once through-flow supercritical generating system of the temperature progressively increasing through the through-flow system.

By superimposing a circulating system across the furnace wall panels of the through-flow system the stresses in these panels resulting from differential temperatures are maintained at a minimum and the design of the tubular panel walls is such that it is not limited by the requirements of the through-flow system. By supplementing the through-flow in the tubes that make up the panel, the temperature rise between the inlet and the outlet of the tubes, particularly during startup and low loads, is greatly reduced being only a fraction of the value that it would be without supplemental flow. This supplemental flow also reduces the possibility of unbalance of fluid temperature in the tubes across the panel and accordingly unbalance of the tube metal temperatures and it permits the use of larger diameter tubes avoiding the disadvantages of the relatively small tubes and further permits the designer to design the panel arrangement without being restricted by the stringent limitations of the through-flow system.

In the invention, as illustrated in the drawings, the improved vapor generator is comprised of two units identified in FIG. 1 as A and B, each of which includes a furnace from which extends a suitable gas pass. Referring to the diagrammatic representation of FIG. 1 the through-flow circuit of the supercritical vapor generator of the invention includes feed pump 16 which forces working medium through conduit 18 and the parallel branch conduits 20 to and through the economizers 22A and 22B in the respective units. From these economizers the through-flow is conveyed through conduits 24 to conduit 26 which leads to the mixing vessel 28 and from this mixing vessel 28 the through-flow is conveyed via conduit 30 to the headers at the lower end of furnace 10B. From these headers the through-flow passes up through the tubes which line the walls of this furnace being received in suitable headers at the upper end of the furnace and being conveyed via conduit 32 to the lower end of furnace 10A where it is received in the headers with which the lower end of the tubes that line this furnace are connected. The through-flow passes up through the tubes that line the walls of furnace 10A and into the headers at the upper end of this furnace. From there the through-flow is conveyed via conduit 34 to the parallel flow conduits 36 which lead to the heat exchange portions 38A and 38B. After traversing these heat exchange portions the through-flow, which is then heated to its desired value, is conveyed via conduits 40 and conduit 42 to the high pressure stage of turbine 44.

The unit is operating on the double reheat cycle and the high pressure reheater is divided into two portions having the relatively small heat exchange portion 46 in gas pass 12B and the larger portion 48 in gas pass 12A. The vapor for the first reheat is conveyed via conduit 50 from turbine 44 to the heat exchanger 46 and then by conduit 52 from this heat exchange portion to the heat exchange portion 48. After being thus heated to its desired temperature the reheat vapor is returned to the turbine via conduit 54.

The second stage or low pressure reheater is located entirely in gas pass 12B with the vapor for the second reheat being conveyed from the turbine by conduit 55 to the reheater 56 where the vapor is heated to its desired temperature being returned to the turbine via conduit 58.

The exhaust from turbine 44 is received in condenser 45 where the vapor is condensed with the condensate being pumped by condensate pump 47 through heater 49 and deaerator 51 to feed pump 16.

Figure 5:
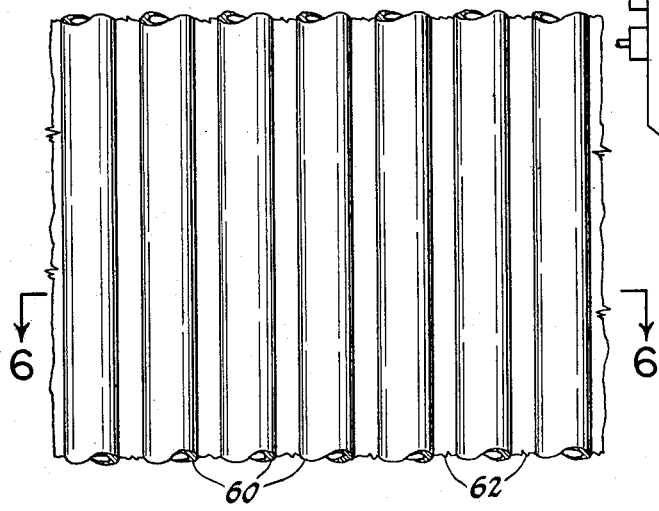
FIG. 5 is a detailed elevation of a portion of the inner surface of the walls of the furnace with this view showing the vertically extending tubes in side-by-side relation and welded together.
Figure 6:
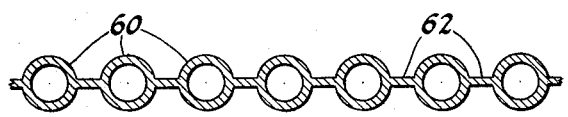
FIG. 6 is a sectional view taken generally along line 6—6 of FIG. 5.

The furnaces of each of the units are constructed in identical fashion with the furnace walls being lined with vertically extending tubes 60 which are in closely spaced relation, as best shown in FIGS. 5 and 6, with adjacent tubes being welded together throughout the entire wall length of the furnace over which the tubes extend. As shown in FIG. 6 a relatively small web 62 is provided between adjacent tubes 60 with the tubes and the webs being united. Each of the furnaces is rectangular in transverse section being provided with a front wall 64, a rear wall 66, and a pair of side walls identified as 68. The tubes 60 which extend upwardly along the inner surface of front wall 64 are connected at their lower ends with header 70 (FIGS. 2 and 3), are bent at their upper ends to extend along the roof of the furnace and are connected at their upper extremity with header 72. The tubes 60 which line the rear wall are connected at their lower ends with header 71 with these tubes conforming to the nose baffle of the furnace and extending along the inclined surface of the gas pass 12A leading from the furnace outlet, with the tubes then extending across the gas pass along the roof thereof and connecting with header 72. The tubes 60 which line the side walls are connected at their lower ends with header 74, extend upwardly along the side walls and have their upper ends connected with header 76 with this header in turn being connected with the header 72.

The economizers 22A and 22B as well as the reheaters 46, 48 and 56 and also the heat exchangers 38A and 38B are of conventional construction being formed of tubular members or two bundles comprised of a large number of tubes which are disposed in suitable planes and bent in sinuous fashion to provide a substantial heat exchange surface positioned in the gas pass or the upper end of the furnace so that the combustion gases traverse the many tubes and impart heat to the working medium flowing through the tubes.

Figure 2:
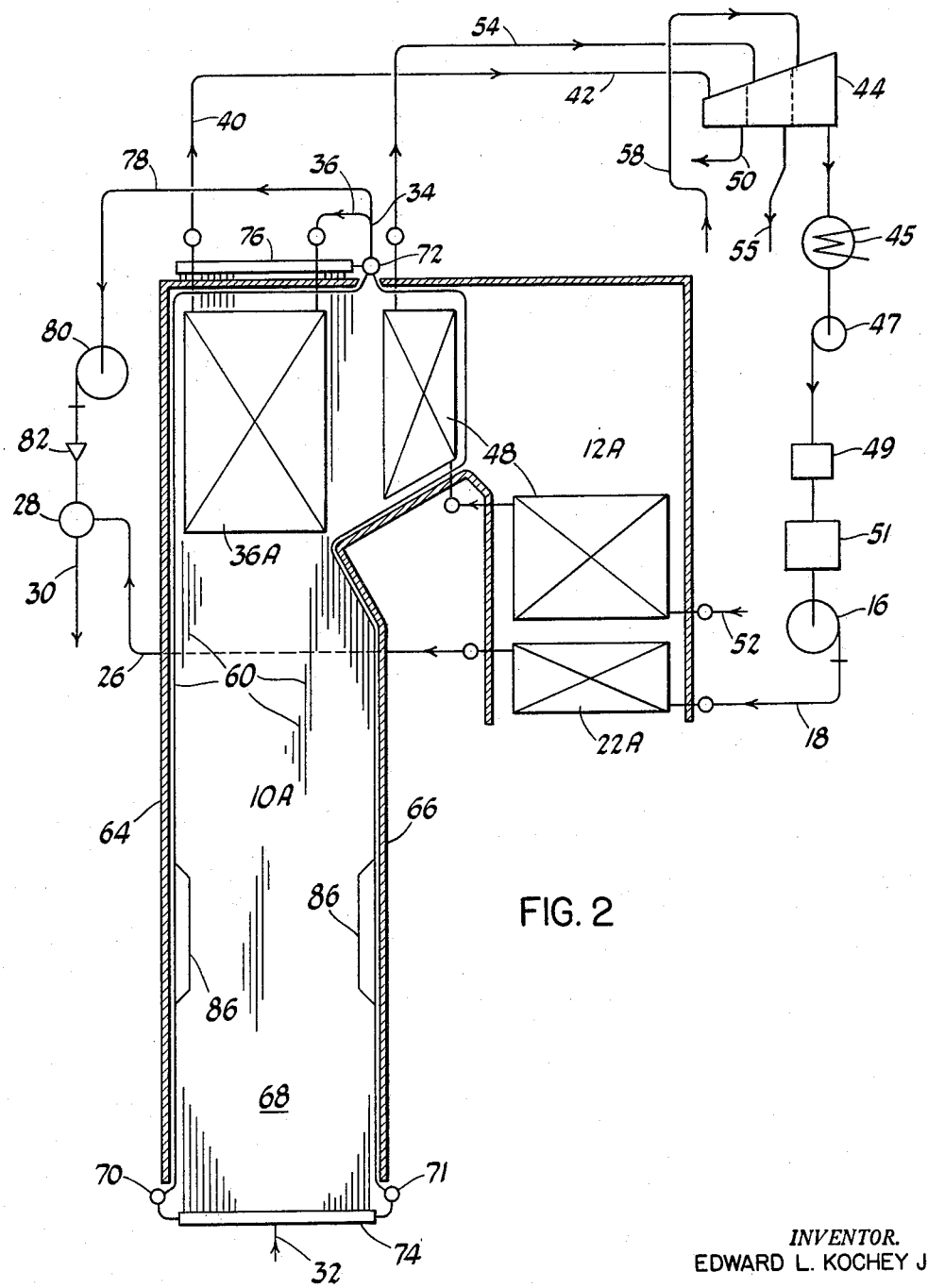
FIG. 2 is in the nature of a vertical section of unit A of the vapor generator with this unit including the predominate or major portion of the high pressure reheater and having none of the low pressure reheater.
Figure 3:
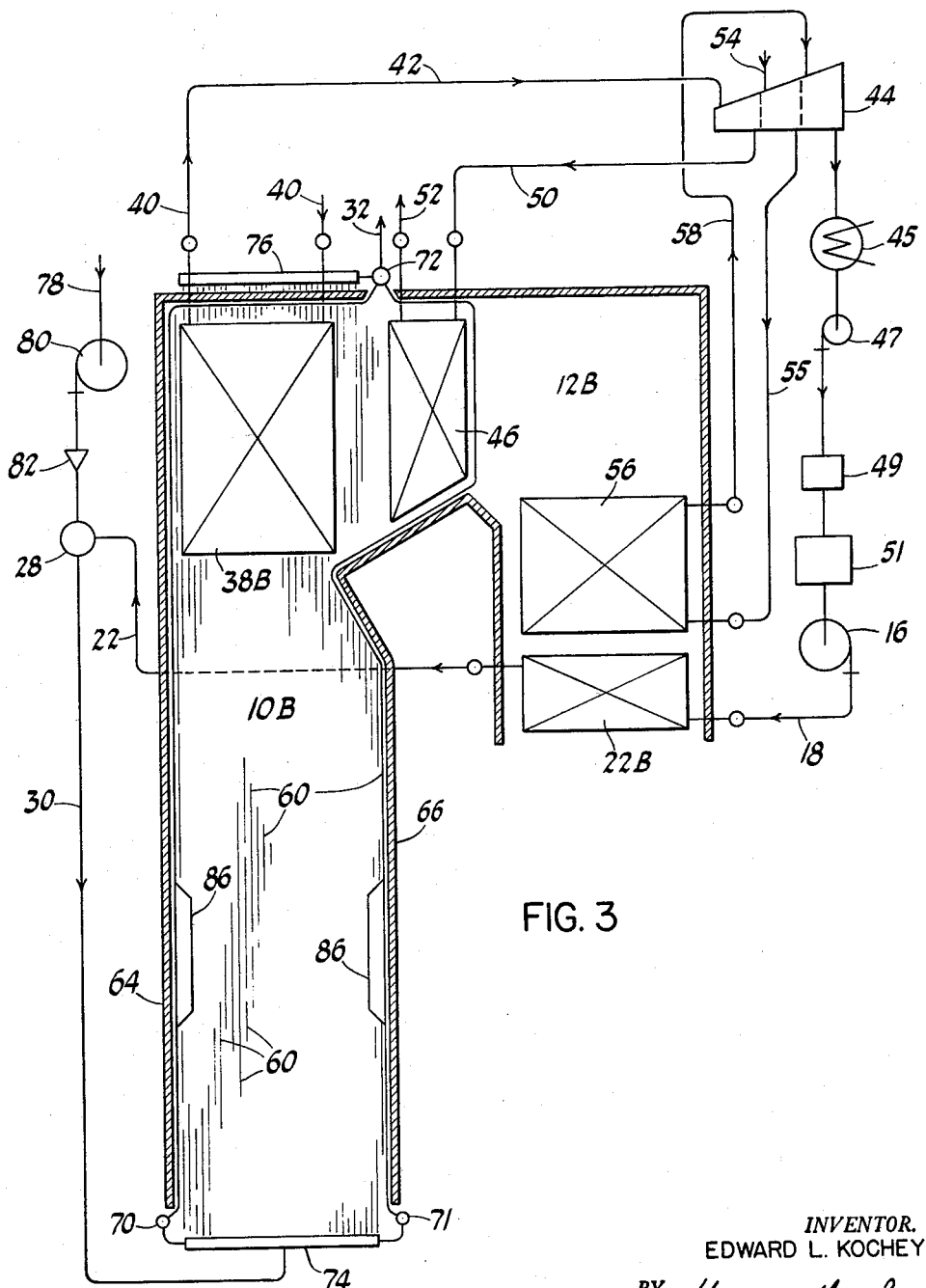
FIG. 3 is a view similar to that of FIG. 2 but representing unit B of the vapor generator which has a minor portion of the high pressure reheater and all of the low pressure reheater.
Figure 4:
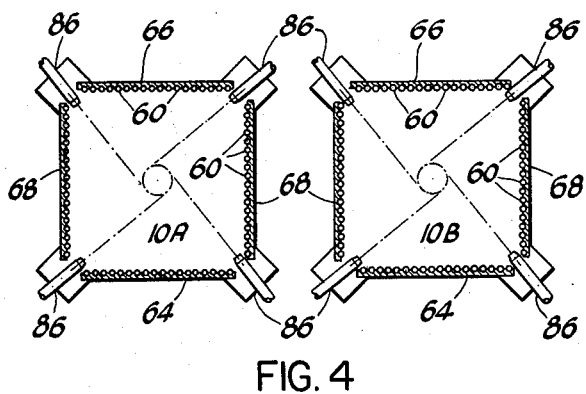
FIG. 4 is in the nature of a transverse sectional view through the furnace portions of the vapor generator showing the two furnaces located in side-by-side spaced relation with their walls lined with vertically extending tubes and with the furnaces being provided with tangential type of firing.

In the illustrative organization depicted in the drawings the heat exchangers 38A and 38B are disposed in the upper end of the furnace (FIGS. 2 and 3) and the high pressure or first stage reheater section 48 is divided into two portions longitudinally spaced within the gas pass 12A as shown in FIG. 2.

The tubes 60 which line the walls of the two furnaces 10A and 10B are of such a diameter, as for example 1¼ to 1⅞ inches, so that the flow velocity that is produced by the through-flow falls below a critical value necessary for adequate tube protection below a predetermined load on the unit as for example 70 percent of maximum load. In order to maintain the velocity through the furnace wall tubes at or above this critical value for loads below said predetermined load and also in order to enable the parallel welded furnace wall type of construction to be employed in a supercritical unit there is superimposed on the through-flow system a recirculating system which is effective to recirculate working medium through the furnace wall tubes of the two furnaces 10A and 10B. In the illustrative organization of FIGS. 1, 2 and 3 this recirculating system includes a recirculating conduit 78, which, as shown in FIGS. 1 and 2, may be connected at its inlet with conduit 34 and at its outlet with mixing vessel 28. Connected into this conduit 78 is a recirculating pump and between the recirculating pump and the mixing vessel is check valve 82 to prevent back flow from the mixing vessel to the pump.

The recirculating system utilizes the heat and pressure characteristics peculiar to supercritical operation to automatically balance the output of a free running, uncontrolled centrifugal pump in the recirculating system to maintain a sufficient but limited recirculating flow at partial power conditions and, where desired, to automatically block the recirculation flow at load conditions above a preselected value. The pump 80 is a centrifugal pump in which the head of the fluid pump varies inversely with the quantity of fluid being pumped and the pump is operated by a constant speed motor.

Figure 8:
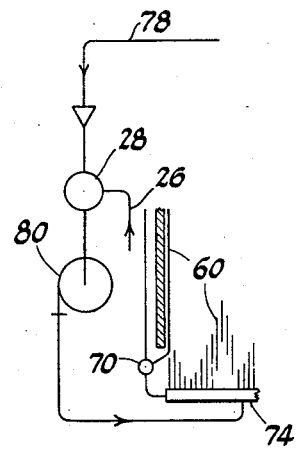
FIG. 8 is a fragmentary view showing a portion of the recirculating system and the supply of working medium to the furnace walls with this view illustrating a modification in connection with the location of the recirculating pump.

In lieu of positioning the recirculation pump 80 in the conduit 78, which is connected across the two furnaces 10A and 10B collectively, the pump may connect into conduit 30 leading from the mixing vessel 28 to the inlet headers at the bottom of furnace 10B. This modified arrangement is shown in FIG. 8 and in such instances the entire through-flow will flow through the recirculation pump identified as 800 in this FIG. 8 illustration. Alternatively the recirculating pump may be connected into conduit 32 extending between the two furnaces or into the outlet conduit leading from the header 72 of furnace 10A and in each of these latter instances the pump will be so disposed that the through-flow will pass through the pump in addition to the recirculation flow.

While the characteristics of the pumps when connected at the different locations will vary somewhat, with the pumps in each instance being centrifugal pumps operated by a constant speed motor and in an uncontrolled manner so that the pumps are floating on the through-flow circuit, they will all have the characteristic of being self-regulating, supplying, in combination with the feed or through-flow, at least the necessary minimum flow velocity at all loads below the minimum load at which the through-flow alone is capable of supplying the minimum velocity and with the pumps providing a combined flow velocity that is in excess of the minimum critical velocity for loads above a predetermined low load below said minimum load. Stated in another way, below a predetermined load on the unit, it is necessary to supplement the through-flow in order to provide the necessary minimum velocity. At some load well below this predetermined load the combined flow produced by the recirculating pump and the through-flow is at or very close to this minimum velocity and for all loads thereabove the combined flow is substantially above this minimum velocity, and with the characteristic operation of the system, with the recirculating pumps organized in the manner aforesaid, the pumps are effective to supplement the through-flow for load values somewhat above said predetermined load. This has several advantages including providing an extra increment of flow velocity at more severe operating conditions and accordingly giving a safer operation and permitting shutting down the circulating pump when the generator operates at a fluctuating load just below and above the no-delivery point of the pump since this operating condition will cause severe temperature fluctuations in portions of the mixing device wherein the recirculation flow is mixed with the through-flow. For a more complete and detailed explanation of the characteristic function and the theory of operation of the recirculating system as described hereinbefore, reference is made to the application of Willburt W. Schroedter entitled "Recirculating System for Steam Generator," Serial No. 127,395, filed on July 27, 1961, now Patent No. 3,135,252 of June 2, 1964 and assigned to the same assignee.

Illustrative of a system employing recirculating pump 80, the design may be such that the through-flow produced by feed pump 16 is inadequate to produce the minimum critical velocity through the tubes 60 in each of the furnace walls below a load of 70 percent on the vapor generator. The action of the self-regulating, uncontrolled free running pump 80 is such that for all loads below 70 percent down to 5 percent load the combined flow, i.e., the through-flow and the recirculating flow, is such as to produce a velocity through the furnace wall tubes that is at least equal to the critical velocity. In some systems, at 30 percent load the combined flow may be very close to the critical value while for loads below and above the 30 percent value the pump and system characteristic is such that the combined flow is above the critical value. From 30 to 70 percent of load the combined flow steadily increases above the critical value and the pump is effective to recirculate fluid up to a load value of 88 percent at which time it is automatically operative to cease delivering fluid, with the pressure drop across the furnaces produced by the through-flow then equalling the head capacity of the pump.

When the recirculating pump is connected into the system in a location such that the through-flow as well as the recirculating flow passes through the pump a bypass with a suitable check valve may be provided around the pump in order to bypass the through-flow during periods when the recirculating pump may not be operating or may not be required. Alternatively, the recirculating pump may be designed to have enough free flow space to permit all of the through-flow to pass through the pump when the same is shut down and without any material pressure drop such as could not be tolerated being developed.

The layout of the various heat exchange surfaces in the supercritical, twin furnace vapor generator of the invention is such as to permit a relatively uncomplicated and yet reliable control system for controlling the temperature of the primary fluid delivered to the turbine as well as the high pressure or first stage reheat and low pressure or second stage reheat temperatures. The temperature and pressure of the primary fluid delivered to the turbine is regulated so that it is maintained at a generally constant value throughout the operating load range of the vapor generator with suitable sensing and regulating equipment of known design and construction and responding to load and other parameters being employed to effect this result. A simplified and diagrammatically represented control is shown in FIG. 1 with load and temperature responsive devices 81 and 83, regulating, through controls 85 and 87, the valves 89 and 91, respectively, to control the fuel supply and feed of the working medium.

Since the reheat surface is disposed in such a manner that all of the low pressure reheat is obtained in the unit B with the low pressure reheater 56 being disposed in gas pass 12B and a major portion of the high pressure reheat is obtained in unit A, with section 48 of the high pressure reheater being disposed in gas pass 12A, the low pressure and the high pressure reheat vapor temperatures may be regulated in part if not wholly by means of regulating the heat content or heating value of the combustion gases passing from the respective furnaces 10B and 10A.

In the illustrative organization depicted in FIGS. 1, 2, 3 and 4, each of the furnaces 10A and 10B are provided with the so-called tilting tangential burner system by means of which the zone of firing may be moved toward and away from the furnace outlet to control the heat content of the gases issuing from the furnace at a given firing rate as illustrated and explained in U.S. Patent No. 2,363,875 issued November 28, 1944, to H. Kreisinger, et al. With this firing method, burners, diagrammatically represented in the drawing as 86, are symmetrically mounted in the furnace walls about the circumference and discharge fuel and air in a direction tangent to an imaginary vertical cylinder centrally located in the furnace so as to create a whirling mass of burning fuel that rotates about the furnace axis. The burners are organized so that the angle to the horizontal of the discharge of fuel and air may be varied thereby varying the location of the zone of combustion in the furnace. As this zone of combustion is moved from a lower region toward an upper region and toward the furnace outlet the heat absorption in the furnace is decreased for a given firing rate, with less of the heat absorbing surface in the furnace being effective, resulting in increasing the heat content or heating capacity of the gases issuing from the furnace and passing through the gas passes that extend therefrom. This increase in heat content increases the heat absorption in the reheater surface disclosed in these gas passes.

The vapor generator of the invention has the characteristic that the reheat temperatures, i.e., the low pressure and the high pressure reheat temperatures, tend to decrease or fall off from their desired value with a decrease in load. Accordingly, as the load is decreased the zone of firing is moved toward the furnace outlet increasing the heat pickup of the reheater surfaces and accordingly offsetting wholly, or at least to a substantial extent, this tendency of the reheat temperatures to fall below their desired value.

With the arrangement of the invention the high pressure reheat is controlled by controlling the zone of firing in furnace 10A and for this purpose the reheat temperature at the location identified as 88, FIG. 1, which is at the outlet of the reheater section 48, may be sensed and through control mechanism 90 the burners 86 in furnace 10A may be regulated so as to control this reheat temperature. Similarly, the low pressure reheat temperature may be sensed at the location 91, at the outlet of low pressure reheater 56 and through control mechanism 92 the burners in furnace 10B may be controlled to regulate the disposition of the firing zone to maintain this low pressure reheat temperature at its desired value. By means of these controls these reheat temperatures may be maintained constant over a substantial load range.

Figure 7:
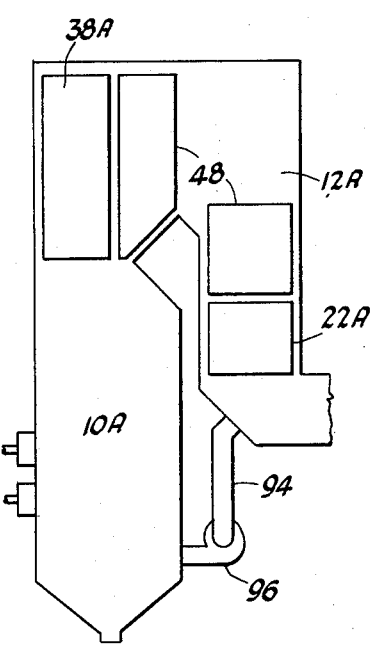
FIG. 7 is a diagrammatic representation in the nature of FIGS. 1 and 2 and showing a modification wherein gas recirculation is employed for control purposes.

In lieu of controlling the low pressure and high pressure reheat temperatures by means of adjusting the firing zone in the furnace, the gas recirculation type of control may be employed. FIG. 7 is a diagrammatic representation of one of the furnaces of the invention equipped with a gas recirculation system. In this system combustion gases after traversing the convection reheaters are conveyed through gas duct 94 by means of the recirculation fan 96 and introduced into the lower portion of the furnace and in such a manner as to decrease the heat absorption in the furnace. The effect thus produced by recirculating combustion gases is to increase the heat content of the gases issuing from the furnace. Accordingly, as the load on the vapor generator is decreased, the amount of gas reintroduced into the furnace is increased thereby increasing the heat content of the gases traversing the reheaters and accordingly offsetting, at least in part, the tendency of the reheat temperatures to decrease with decrease in load. With this gas recirculation control, as with the tilting burner control, each of the furnaces 10A and 10B is regulated separately so that the high pressure reheat and the low pressure reheat, respectively, may be controlled and maintained at their desired value over a substantial load range. In the gas recirculation type of control the gas recirculation fan 96, one of which would be associated with each of the furnaces 10A and 10B, could be regulated with regard to its delivery by means of a control organization such as the control mechanism 90 and the control mechanism 92. The regulation could be obtained by regulating the speed of the gas recirculation fan or dampers could be employed in the gas recirculation duct to regulate the quantity of gases recirculated.

It is to be understood that the invention is not limited to the specific embodiment herein illustrated and described but may be used in other ways without departure from its spirit and that various changes can be made which would come within the scope of the invention which is limited only by the appended claims.

What is claimed is:

1. A forced through-flow vapor generator for operation at supercritical pressure and including a through-flow circuit through which the working medium is forced at supercritical pressure, a plurality of separate elongated furnaces of relatively large volume with each having a separate gas pass extending therefrom within which is disposed heat exchange means, the walls of each furnace being lined with tubes in side-by-side and parallel flow relation, these tubes being connected into and forming part of the through-flow circuit with said wall lining tubes of different furnaces being in series flow relation such that the through-flow passes through the several furnaces successively, and means superimposed on the through-flow circuit operative to increase the flow through the furnace wall tubes over and above that of the through-flow.

2. In a vapor generator the combination of a pair of vertically disposed separated furnaces of relatively large volume through which hot combustion gases pass with each having a separate gas pass extending therefrom and within which is disposed heat exchange means, the walls of each furnace being lined with vertically extending tubes, with these tubes of the one furnace being in series flow relation with the tubes of the other furnace, feed pump means communicating with and operative to force the working medium through said tubes at supercritical pressure and at a rate to satisfy the demand on the generator, but, below a predetermined load, less than a critical rate required for protection of the furnace tubes, a free running circulating pump connected directly across the tubes of the two furnaces with respect to the flow of the working medium and operative to recirculate the working medium through these tubes and having a capacity to insure that the flow through the tubes does not fall below said critical rate.

3. In a vapor generator the combination of a pair of separate furnaces in side-by-side spaced relation, means for burning a fuel and passing the hot combustion gases through said furnaces, said furnaces being defined by wall members with these members of each furnace having their inner surface lined by vertically extending tubes in side-by-side relation and connected at their lower ends with suitable inlet header means and at their upper ends with suitable outlet header means so that these tubes for each furnace are in parallel flow relation, said tubes being welded together throughout their overlying wall portion thereby providing a generally imperforate metallic inner surface for the walls of the furnace, a through-flow system through which the working medium is passed at supercritical pressure, said system including feed pump means operative to force the medium through said system at said supercritical pressure and at a rate in accordance with the demand on the vapor generator, the furnace wall tubes forming part of the through-flow system, with the through-flow passing up through the tubes of one furnace and with means for directing the flow from these tubes up through the tubes of the other furnace, the flow rate through these furnace wall tubes produced by the feed pump being below a critical rate required for tube protection when the load on the unit is less than a predetermined value, means increasing the flow through the furnace wall tubes in supplement to the through-flow to maintain the rate not less than said critical rate for all loads including a recirculating system operative to recirculate working medium through the furnace wall tubes of the pair of furnaces and which system includes a free running circulating pump means having a characteristic to maintain the flow through the furnace wall tubes at a value not less than said critical rate for all loads below said predetermined load and within the range of operation of the unit said circulating pump being ineffective to cause a recirculation of working medium at a load value above said predetermined load.

4. A forced through-flow tubular vapor generator having a through-flow circuit through which generally the entire working medium of the generator is forced at supercritical pressure and during traversal of which it is heated to a desired temperature, said generator including a pair of separate furnaces each of which has its walls lined with heat exchange tubes with the tubes of the one furnace being in series flow relation with the tubes of the other furnace and with these tubes forming part of said through-flow system such that generally the entire working medium of the generator flows through these tubes of each furnace, the tubular wall lining of each furnace being comprised of side-by-side tubes in parallel flow relation with adjacent tubes being bonded together generally throughout the wall length and with each tube having only a single pass of the furnace, a recirculating system operative to recirculate working medium through said tubular wall lining and including a conduit connected across the wall tubes of both furnaces with respect to the flow of the working medium through these tubes, and pump means operative to produce a recirculation of the working medium.

5. The organization of claim 4 wherein the pump means is located in said conduit connected across the wall tubes.

6. The organization of claim 4 wherein the pump means is in the through-flow circuit.

7. A tubular supercritical vapor generator comprising a first elongated vertically disposed furnace having its walls fully lined with generally vertical parallel flow tubes joined in a manner to form a generally imperforate lining for the furnace walls, a second similarly constructed furnace separate from said first, means operative to force generally the entire working medium of the vapor generator through the tubes thereof at supercritical pressure including said furnace wall tubes, means directing generally the entire working medium through said parallel flow wall lining tubes of said one furnace, means directing the effluent from said one furnace through the parallel flow wall lining tubes of said second furnace, and means operative to increase the flow through the furnace wall tubes above that provided by the means forcing working medium through the tubes of the generator including a recirculating means connected across the furnace wall tubes with regard to the flow of the working medium therethrough and means operative to recirculate the working medium therethrough.

8. A supercritical vapor generator comprising in combination a pair of separate vertically disposed furnaces in side-by-side relation, each of the furnaces having its walls lined with vertical parallel flow tubes each of which forms a separate flow path for the working medium upwardly of the furnace with adjacent tubes in the respective furnaces being welded together generally throughout the furnace height to provide an imperforate inner wall surface, a through-flow system including the furnace wall tubes and including means for directing generally the entire working medium of the generator upwardly through wall lining tubes of one furnace in parallel flow relation and thereafter upwardly through the wall lining tubes of the other furnace in parallel flow relation and with there being provided means for conveying the working medium from the upper end of the tubes of one furnace to the lower end of the tubes of the other furnace for passage upwardly therethrough, feed pump means connected into said through-flow system and forcing the working medium therethrough at supercritical pressure, the furnace wall tubes being related to the feed pump in a manner such that below a predetermined load the feed pump is incapable of providing a minimum velocity through the tubes necessary for tube protection, means effective to increase this velocity and maintain it at least at said minimum for loads below said predetermined load including a recirculating system connected across the furnace wall tubes with respect to flow of the working medium and pump means operated at constant speed and having a characteristic to maintain the flow through the furnace wall tubes at or above said critical value.

9. The method of operating a forced through-flow supercritical vapor generator supplying a variable load and having a pair of furnaces of relatively large volume lined with parallel flow tubes extending vertically of the furnace and welded together throughout the furnace to form a generally imperforate lining, comprising the steps of burning a fuel in each of the furnaces and passing the combustion gases thus produced therethrough, establishing a through-flow of generally the entire working medium at supercritical pressure, directing the same upwardly through the parallel flow tubes of first one furnace and thereafter through the other furnace, the through-flow being insufficient below a predetermined load to provide the minimum necessary flow velocity through the furnace wall tubes, supplementing the through-flow below said predetermined load by recirculating working medium through the furnace wall tubes including withdrawing medium from the through-flow system after it has traversed both furnaces and introducing it into the system upstream of said furnaces, maintaining the recirculation sufficient to provide a flow velocity through the furnace wall tubes at least not less than said minimum necessary velocity at loads below said predetermined load.

10. A supercritical vapor generator operating on the double reheat cycle comprising a first furnace having a gas pass extending therefrom, a second furnace having a gas pass extending therefrom, separate means for generating combustion gases and passing the same through the respective furnaces and gas passes associated therewith, a through-flow system, a feed pump operative to force generally the entire working medium of the generator through said system at supercritical pressure, said system including furnace wall tubes lining each of the furnaces and through which generally the entire through-flow is passed with these tubes of each respective furnace being in parallel flow relation and with the tubes on the walls of one furnace being connected in series with the tubes on the walls of the other furnace for flow therethrough, a first stage reheater including means in the gas pass extending from said one furnace, a second stage reheater including means disposed in the gas pass of the second furnace, a recirculating system connected across the furnace wall tubes with respect to the flow of working medium therethrough and having means operative to supplement the through-flow through these tubes, means operative to control at least in part the temperature of said first and second stage reheats including means to adjust the heat content of the combustion gases egressing from each furnace and at a given firing rate.

11. The organization of claim 10 wherein means are provided to introduce fuel directly into the furnaces for burning therewithin to form a combustion zone and wherein the control means include means for varying the combustion zone within the furnaces and with respect to the gas pass extending from the furnace.

12. The organization of claim 10 wherein the control means includes means to introduce combustion gases into the respective furnaces after traversal of the respective reheat stages and in such a manner as to decrease the heat absorption in the furnace.

13. In a vapor generator of the forced through-flow type operating at supercritical pressures the combination of a through-flow circuit, feed pump means effectively connected into said circuit and operative to force the working medium therethrough at supercritical pressure and in accordance with the demand on the generator, a plurality of separate elongated furnaces, means firing said furnaces, the walls of each furnace being fully lined with tubes in side-by-side and parallel flow relation, these tubes connected into and forming a part of the through-flow circuit with these tubes thus lining the walls of one furnace being in series flow relation with these tubes thus lining the walls of the other furnace, a separate gas pass extending from each furnace, a first stage reheater in the gas pass of one of said furnaces, a second stage reheater in the gas pass of another of said furnaces, separate means associated with each furnace for controlling the heat content of the gases passing over these reheaters and independent of the firing rate, and means superimposed on the through-flow circuit operative to increase the flow through the furnace wall tubes over and above that of the through flow.

14. A tubular supercritical vapor generator operating on the double reheat cycle comprising a first vertically elongated furnace with an outlet at its upper end and having its walls lined with generally vertical tubes in side-by-side parallel flow relation connected at their lower end with a suitable inlet header and at the upper end with a suitable outlet header, said tubes being welded together throughout the furnace height to provide a general imperforate inner wall lining, a second similarly constructed furnace separate from said first furnace, separate means associated with each furnace for firing the same, with combustion gases that are generated from the burning of fuel in the furnaces passing up therethrough and out said outlet, a separate gas pass extending from each of the furnace outlets, a through-flow system including means for conveying the working medium at supercritical pressure first up through the wall tubes of one of said furnaces and then up through those of the other furnace, said system including additional heat exchange means over which the combustion gases passing through each of the furnaces traverse and being effective to heat the working medium to its desired temperature, feed pump means forcing the through-flow through said circuit and in accordance with the demand on the unit, the relationship of the furnace wall tubes and through-flow being such that insufficient flow for furnace tube protection is provided below a predetermined load, a recirculating system connected across the furnaces and having means effective to increase the flow through the furnace wall tubes to maintain the same above a predetermined minimum value for loads below said predetermined load, means in the gas pass extending from one of the furnaces for reheating the vapor a first time, means in the gas pass associated with the other furnace for reheating the vapor a second time and independent means associated with each furnace effective to regulate the heating capacity of the gases passing over the respective reheaters and at a predetermined firing rate to control, at least in part, the temperature of the reheat vapor.

15. A vapor generator operating on the double reheat cycle, and comprising a pair of separated furnaces, separate means for firing each furnace, the furnaces being of welded wall construction having parallel upright tubes on their walls, a through-flow system wherein the working medium is heated to its desired temperature including the wall tubes of the two furnaces with the tubes of one furnace being in series flow relation with those of the other and with said tubes being connected for upflow therethrough and a feed pump connected with said system and operative to force the working medium through said system at supercritical pressure, means superimposed on the through-flow system operative to recirculate working medium through said furnace wall tubes including a pump means for effecting such recirculation, a first stage reheater subjected primarily to combustion gases from one of said furnaces, a second stage reheater subjected to combustion gases from the other furnace, and means for controlling the temperature of these reheats including means operative, independent of firing rate, to adjust the heat content of the gases egressing from the respective furnaces.

16. A vapor generator operating on the double reheat cycle and comprising a pair of separated furnaces each having combustion gas outlets, each of said furnaces being separately fired and having means for projecting fuel and air therethrough to create a burning mass therewithin at a combustion zone, the furnaces being of welded wall construction having parallel upright tubes, a through-flow system wherein the working medium is heated to its desired temperature including the wall tubes of the two furnaces, with the tubes of one furnace being connected in series flow relation with those of other and connected into the through-flow system for up-flow through said tubes, a feed pump connected with said system and operative to force the working medium through said system at supercritical pressure, means superimposed on the through-flow system operative to recirculate working medium through said furnace wall tubes including a pump means for effecting such recirculation, a first stage reheater subjected primarily to combustion gases from one of said furnaces, a second stage reheater subjected to combustion gases from the other furnace, means for controlling the temperature of these reheats including means to adjust the combustion zone within each furnace and with respect to the outlet of each furnace to vary the heat content of the gases egressing from the respective furnaces.

17. A vapor generator operating on the double reheat cycle and comprising a pair of separated furnaces, separate means for firing each furnace, the furnaces being of welded wall construction having parallel upright tubes, a through-flow system wherein the working medium is heated to its desired temperature including the wall tubes of the two furnaces in series and connected for upflow therethrough and a feed pump connected into said system and forcing the working medium through said system at supercritical pressure, means superimposed on the through-flow system operative to recirculate working medium through said furnace wall tubes including a pump means for effecting such recirculation, a first stage reheater subjected primarily to combustion gases from one of said furnaces, a second stage reheater subjected to combustion gases from the other furnace, means for controlling the temperature of these reheats including means operative to recirculate gases which have traversed the respective reheat stages back to the respective furnaces and means to control this recirculation to vary the heat content of the gases egressing from the respective furnaces and traversing the respective reheater stages.

18. A vapor generator operating on the double reheat cycle, and comprising a pair of separated furnaces, separate means for firing each furnace, the furnaces being of welded wall construction having parallel upright tubes, a through-flow system wherein the working medium is heated to its desired temperature including the wall tubes of the two furnaces in series and connected for upflow therethrough, feed pump means connected into said system and forcing the working medium through said system at supercritical pressure and at a rate to satisfy the load on the generator, and which produces a velocity through the furnace wall tubes which is below a desired minimum when the load decreases to a given value, a free running circulating pump connected across the furnace wall tubes of both furnaces collectively with respect to flow of the working medium operative to establish a positive recirculation of working medium through said tube and maintain a combined flow velocity through the tubes at least equal to a preselected velocity at a load below said given load value, said pump having the characteristic of providing an increasing flow velocity as the load and accordingly the feed pump output increases and produces a velocity which exceeds said desired minimum at said given load value, a first stage reheater subjected primarily to combustion gases from one of said furnaces, a second stage reheater subjected to combustion gases from the other furnace, means for controlling the temperature of these reheats including means operative, independent of firing rate, to adjust the heat content of the gases egressing from the respective furnace.

19. In the operation of a forced through-flow supercritical vapor generator on the reheat cycle the method comprising burning fuel in a first zone and creating a stream of combustion gases, burning a fuel in a second zone creating a second stream of combustion gases, forcing generally the entire working medium of the generator at supercritical pressure through a continuous path and directing said medium first in heat exchange relation with the burning fuel in one of said zones, thereafter in heat exchange relation with the burning fuel in the other of said zones, and thereafter in heat exchange relation with the combustion gases passing from said zones, conveying the effluent from said continuous path to a point of use and utilizing a portion of the energy in said medium, thereafter reheating said medium by passing the same in heat exchange relation with the combustion gases generated in one of said zones, directing this reheated working medium to said point of use and utilizing a further portion of the energy therein; again reheating said medium by passing the same in heat exchange relation with the combustion gas stream produced in said other zone and again directing the reheated medium to said point of use and utilizing a further portion of the energy therein, regulating the firing rate in each of said zones and the delivery of the fluid medium to said path to maintain the pressure and temperature of the medium egressing from said path at a desired value, and regulating at least in part the temperature of each of the reheats by regulating the heat content of the gases egressing from each of said zones while maintaining the firing rate at its desired value.

20. The method of claim 19 wherein the heat content of said gases is regulated by reintroducing combustion gases into said zones after said gases have been passed in heat exchange relation with the respective reheats and in a manner to decrease the heat absorption in each of said zones.

21. The method of claim 19 wherein the working medium is passed in confined streams in bounding relation with each of said zones and wherein the zone of combustion is shifted so as to vary the heat imparted to the fluid medium in bounding relation to said zones.

22. In a supercritical vapor generator having a pair of separated furnaces each of which has a gas pass extending therefrom with the furnace walls being lined with heat exchange tubes and with the generator having a through-flow system which includes said tubes, the method of operation comprising burning fuel in each of said furnaces with the gases passing therethrough and through the gas passes extending therefrom, forcing the working medium through the through-flow system first through the tubes lining one furnace and thereafter through the tubes lining the other furnace and absorbing heat evolved by the burning fuel in each furnace thereby heating the medium to its desired temperature, expanding said medium at a first stage, thereafter conveying the expanded medium in heat exchange relation predominantly with the combustion gas stream in one of said gas passes, further expanding said medium at a second stage, thereafter conveying this again expanded medium in heat exchange relation predominantly with the gas stream in the other gas pass, expanding this reheated medium at a third stage, providing control actions, including controlling the delivery of the medium to the through-flow system and the rate of firing of the two furnaces, to maintain the temperature and pressure, respectively, delivered to said first stage generally at a desired value, and separately regulating the heat content of the combustion gases in each of said streams, independent of the furnace firing rate, to regulate the temperature of the working medium delivered to said second and said third expansion stages respectively.

23. A forced through-flow vapor generator operating at supercritical pressures and including a first furnace and a second frunace each of which have independent gas passes extending therefrom, means for independently firing the furnaces, a through-flow circuit, means for forcing the working medium through said circuit at supercritical pressure, each of the furnaces having parallel flow heat exchange tubes on its walls with adjacent tube portions being welded together, said furnace wall tubes forming part of the through-flow circuit with said circuit including means for directing generally the entire through-flow of the unit through the tubes of one of said furnaces and then through the tubes of the other furnace, additional heat exchange surface in each of said gas passes forming part of the through-flow circuit and reheater heat exchange surface disposed to be heated primarily by the heat produced from the burning of the fuel in one of said furnaces.

24. A forced through-flow vapor generator operating on the reheat cycle and comprising a pair of units each of which includes a furnace and a gas pass extending therefrom, means independently firing said furnaces, a through-flow circuit through which the working medium of the generator is conveyed at supercritical pressure, means for forcing said medium through said circuit, said circuit including a plurality of heat exchange organizations connected in series flow relation one of which organizations includes furnace wall tubes lining the inner surface of the furnace of one unit with the tubes being welded together to form a generally imperforate surface, the furnace of the other unit having similar furnace wall tubes which form another heat exchange organization of the through-flow circuit and connected to receive the through-flow after its traversal of the wall tubes lining the inner surface of the furnace of said one unit, reheater means operative to reheat the vapor after a portion of its energy has been utilized and having a major portion associated with one of said units, and means independent of the firing rate of said one unit operative to regulate the heat imparted to said reheater means.

25. A forced through-flow vapor generator operating at supercritical pressure and on the double reheat cycle, said generator comprising a pair of units each of which includes a furnace and a gas pass extending therefrom, means independently firing said furnaces, a through-flow circuit through which the working medium of the generator is conveyed at supercritical pressure and during traversal of which it is heated to its desired temperature, means forcing said medium through said circuit, said circuit including a plurality of heat exchange sections connected in series flow relation, furnace wall tubes provided with each of said units and with the tubes of different units forming separate heat exchange sections of the through-flow circuit and connected so that the through-flow first passes through these wall tubes of one unit and then through these wall tubes of the other unit, a high pressure reheater disposed so it is heated primarily with one of said units, a low pressure reheater disposed so it is heated primarily by the heat evolved in the other of said units and means independent of the firing rate of each unit operative to regulate the heat imparted to the low pressure and the high pressure reheater.

26. A forced through-flow vapor generator comprising in combination a first unit having a furnace and a gas pass and a second unit having a furnace and a gas pass, means for independently firing these furnaces, a through-flow circuit through which the working medium is forced at supercritical pressure, means for forcing said working medium through said circuit, said through-flow circuit including economizer heat exchange sections in each of the gas passes, tubular members on the walls of one of said units connected to receive the through-flow from said economizer sections, tubular members on the walls of the other of said units connected to receive the through-flow from said members of said one unit, additional heat exchange sections associated with each of the units and connected to receive the through-flow after its traversal of the tubular members on the walls of said other unit, a high pressure reheater disposed so it receives a major portion of its heat input from one unit and a low pressure reheater disposed so it receives a major portion of its heat input from the other unit and means, independent of the firing rate of each of said units, effective to vary the heat input to each of said reheaters.

27. A vapor generator of the once through-flow type operating at supercritical pressure and comprising a through-flow circuit through which generally the entire primary fluid of the generator passes, a pair of vertically disposed furnaces of relatively large volume with each furnace having a separate gas pass extending therefrom within which is disposed heat exchange means, a plurality of firing means mounted on each furnace, each furnace having its walls lined with tubes in side-by-side parallel flow relation, these wall tubes forming at least part of said through-flow circuit such that generally the entire primary fluid of the generator passes through these tubes of each furnace, with these tubes of one furnace being connected in series flow relation with those of the other furnace.

28. The organization of claim 27 wherein adjacent furnace wall tubes are joined generally throughout the extent of the furnace and a recirculation system is superimposed on the through-flow circuit and has means operative to supplement the through-flow through the furnace wall tubes below a predetermined load on the generator.

29. A vapor generator of the once through-flow type operating at supercritical pressure and comprising a through-flow circuit, a pair of furnaces, means for firing each of the furnaces to produce a combustion gas stream, each of the furnaces having its walls lined with tubes in side-by-side parallel flow relation, these wall tubes forming at least part of said through-flow circuit with these tubes of one furnace being connected in series flow relation with those of the other furnace, a high pressure reheater disposed to receive a major portion of its heat from the burning of fuel in one of the furnaces, a lower pressure reheater disposed to receive a major portion of its heat from the burning of fuel in the other furnace, and means independent of the firing rate of the furnaces operative to vary the heat input of the reheaters to control the reheat temperatures with varying load.

30. A vapor generator of the once through-flow type operating at supercritical pressure and comprising a through-flow circuit, a pair of furnaces, means for firing each of the furnaces to produce a combustion gas stream, each of the furnaces having its walls lined with tubes in side-by-side parallel flow relation, these wall tubes forming at least part of said through-flow circuit with these tubes of one furnace being connected in series flow relation with those of the other furnace, economizer surface having the combustion gases produced in the furnaces flowing thereover and connected into the through-flow circuit upstream of the wall lining tubes of said one furnace, additional heat exchange means disposed to receive heat evolved in each of the furnaces and connected into the through-flow circuit downstream of the wall lining tubes of said other furnace, a high pressure reheater disposed to receive a major portion of its heat from the burning of fuel in one of the furnaces, a lower pressure reheater disposed to receive a major portion of its heat from the burning of fuel in the other furnace, and means independent of the firing rate of the furnaces operative to vary the heat input of the reheaters to control the reheat temperatures with varying load.

References Cited in the file of this patent

UNITED STATES PATENTS

| | | |
|---|---|---|
| 2,685,279 | Caracristi | Aug. 3, 1954 |
| 2,918,798 | Schroder | Dec. 29, 1959 |
| 2,952,975 | Braddy | Sept. 20, 1960 |
| 2,962,005 | Koch | Nov. 29, 1960 |
| 2,984,984 | Dickey | May 23, 1961 |
| 3,017,870 | Profos | Jan. 23, 1962 |
| 3,028,844 | Durham et al. | Apr. 10, 1962 |
| 3,038,453 | Armacost | June 12, 1962 |

FOREIGN PATENTS

| | | |
|---|---|---|
| 323,723 | Switzerland | Sept. 30, 1957 |
| 813,175 | Great Britain | Mar. 23, 1960 |
| 818,159 | Great Britain | Aug. 12, 1959 |
| 868,613 | Great Britain | May 25, 1961 |
| 971,815 | Germany | Apr. 2, 1959 |